United States Patent [19]

Katsumata

[11] Patent Number: 4,631,607
[45] Date of Patent: Dec. 23, 1986

[54] CASSETTE LOADING DEVICE

[75] Inventor: Hiroshi Katsumata, Kanagawa, Japan

[73] Assignee: Sony Corporation, Tokyo, Japan

[21] Appl. No.: 657,355

[22] Filed: Oct. 3, 1984

[30] Foreign Application Priority Data

Oct. 7, 1983 [JP] Japan .................................. 58-188847

[51] Int. Cl.[4] ............................................. G11B 15/66
[52] U.S. Cl. ........................................ 360/96.5; 360/85
[58] Field of Search ..................... 360/96.5, 85, 95, 92, 360/93, 96.1, 96.2, 96.6

[56] References Cited

U.S. PATENT DOCUMENTS 4,257,075 3/1981 Wysocki et al. .................... 360/96.5
4,320,424 3/1982 Murayama .......................... 360/96.5
4,491,885 1/1985 Morikawa et al. .................. 360/85

FOREIGN PATENT DOCUMENTS 56-119965 9/1981 Japan .................................. 360/96.5

OTHER PUBLICATIONS

Leon, "Cartridge Loading Mechanism," IBM Technical Disclosure Bulletin, vol. 21, No. 5, Oct. 1978, pp. 2033-2034.

Primary Examiner—John H. Wolff
Assistant Examiner—Matthew J. Bussan
Attorney, Agent, or Firm—Lewis H. Eslinger; Alvin Sinderbrand

[57] ABSTRACT

A cassette holder which conveys a cassette between a cassette inserting position and a cassette loading position is opened at its top so as to form a channel-like section, and this top is covered with a cassette pressing plate which is urged downward by a spring. When the cassette holder including the cassette is moved to the cassette loading position, the cassette pressing plate follows this cassette holder and then pushes down the whole top face of the cassette so as to be able to prevent the cassette from an erroneous insertion and position the cassette quite stably and accurately on positioning pins in the cassette loading position.

11 Claims, 16 Drawing Figures

FIG. IA
PRIOR ART
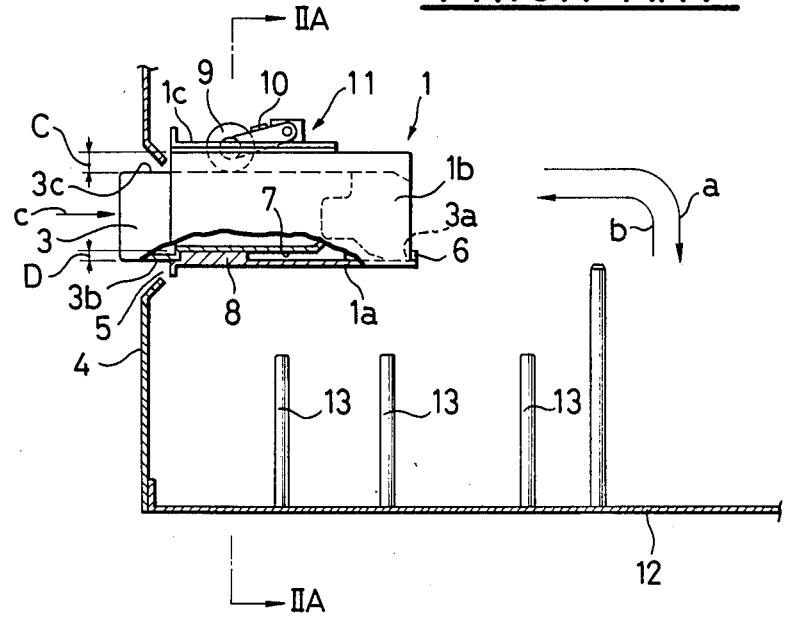
FIG. IB
PRIOR ART
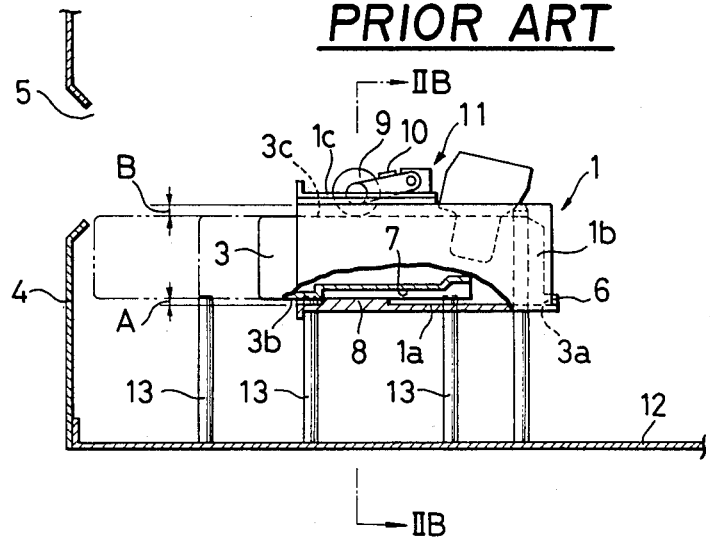

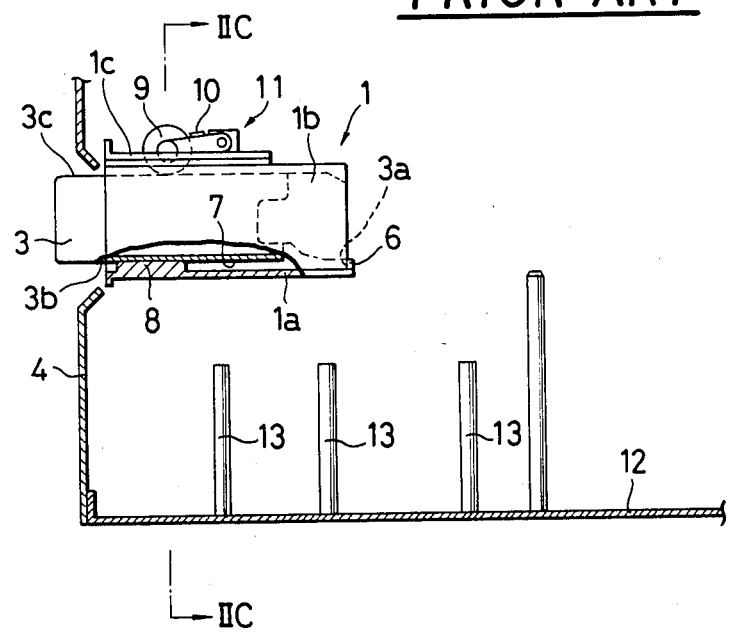
FIG.IC PRIOR ART

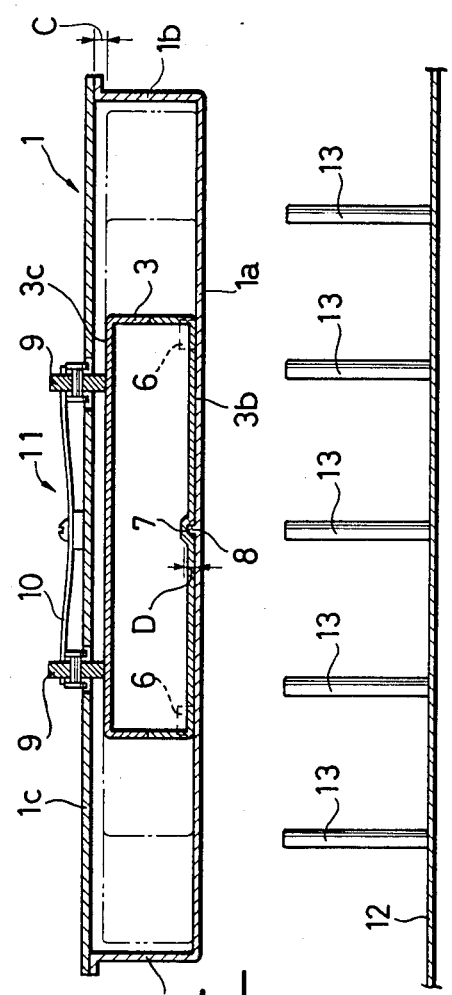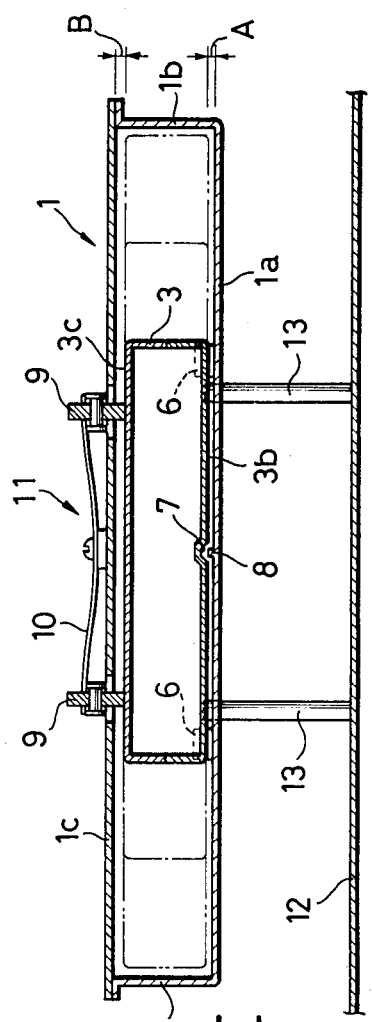
FIG.2A PRIOR ART
FIG.2B PRIOR ART

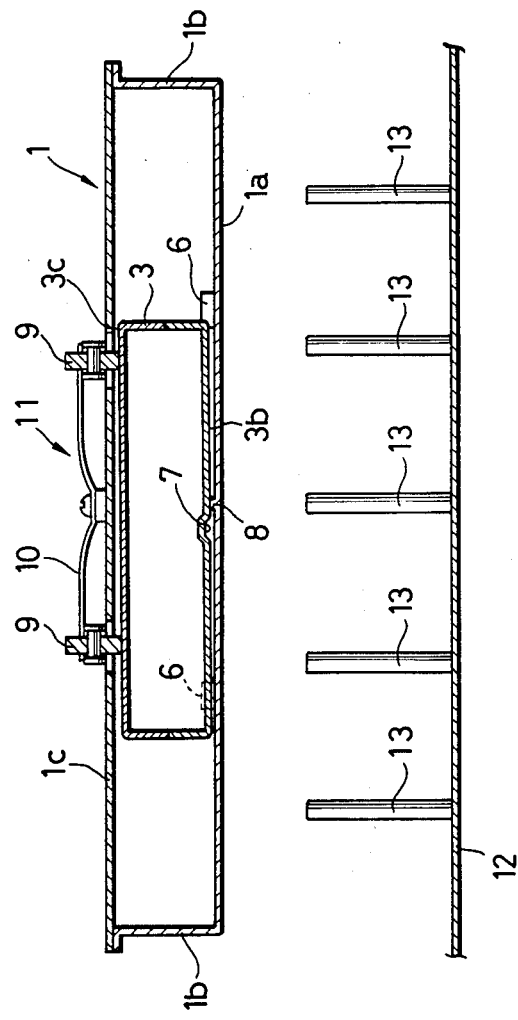

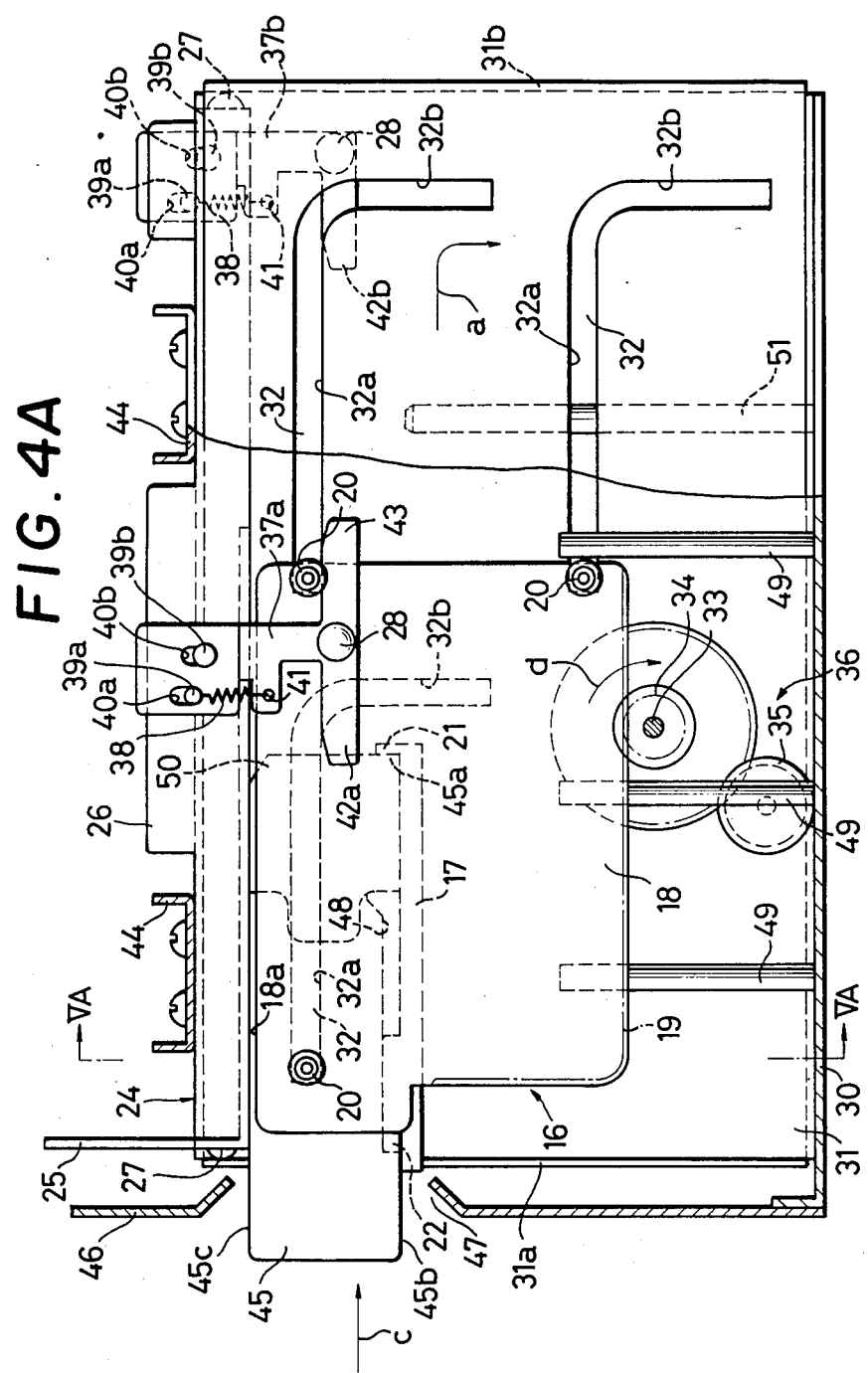

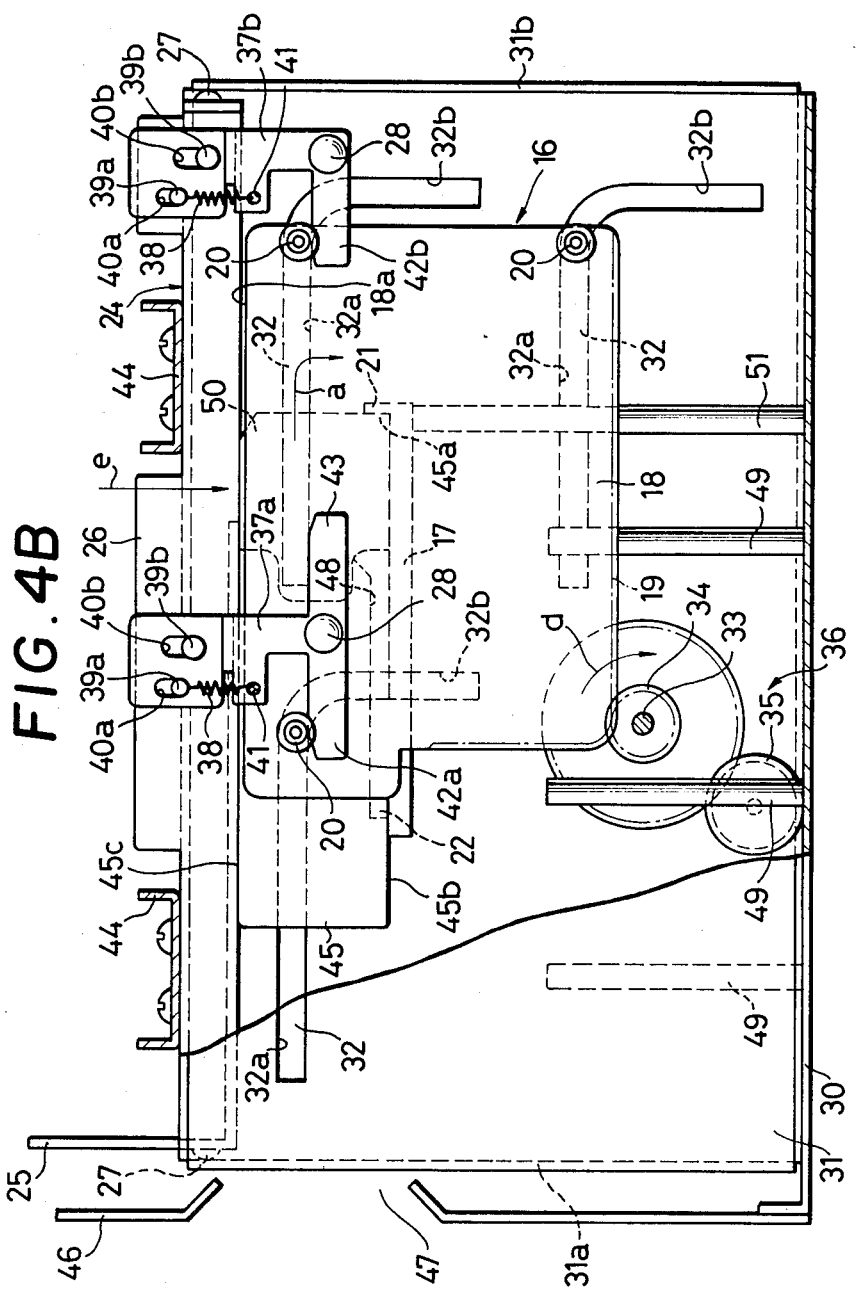

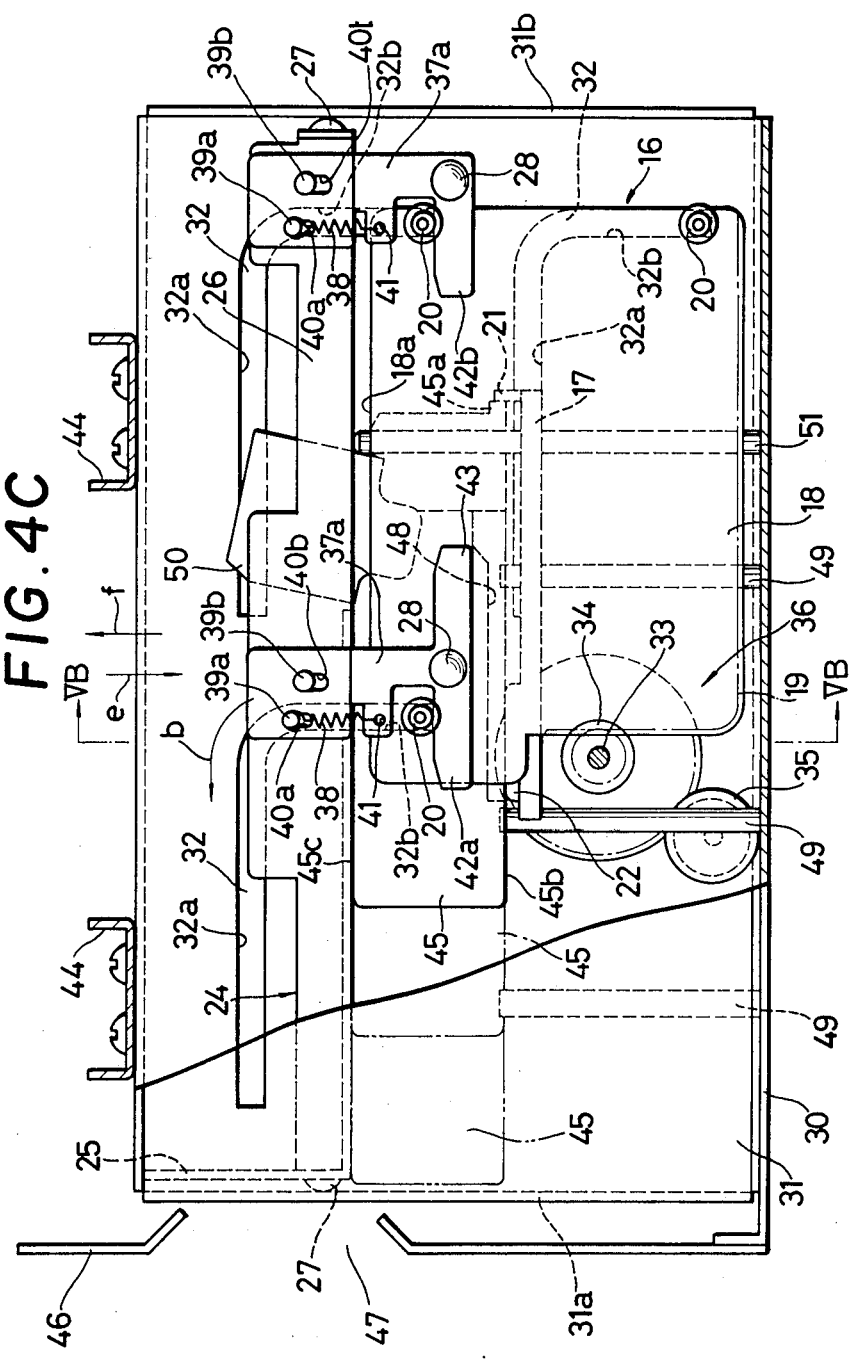

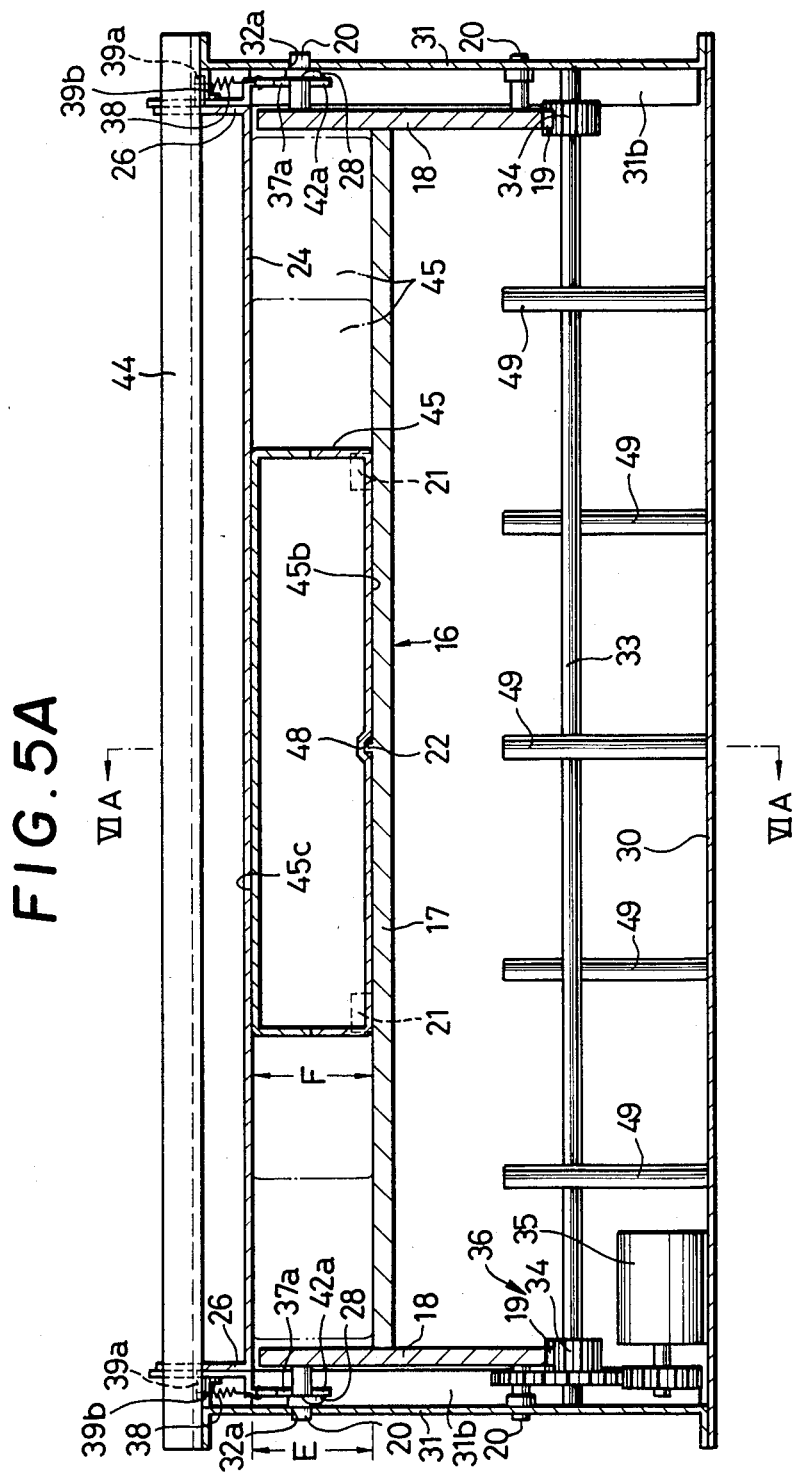

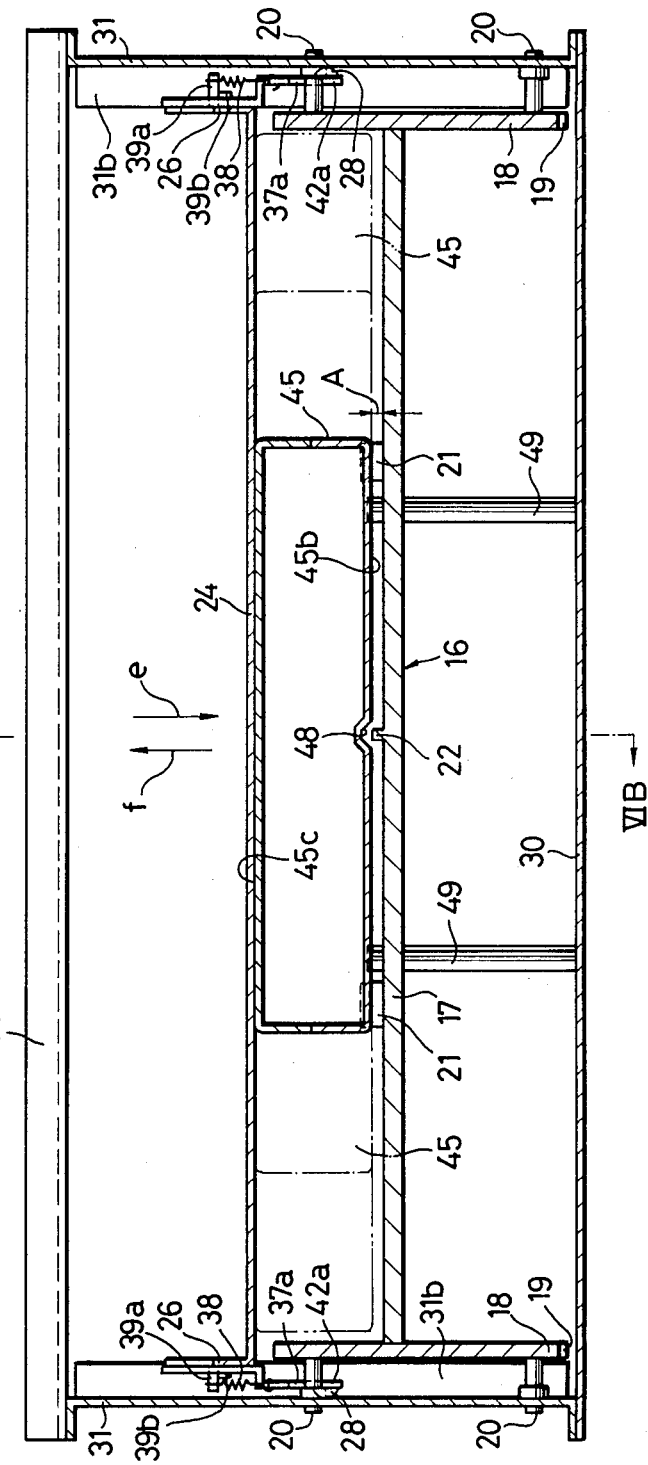

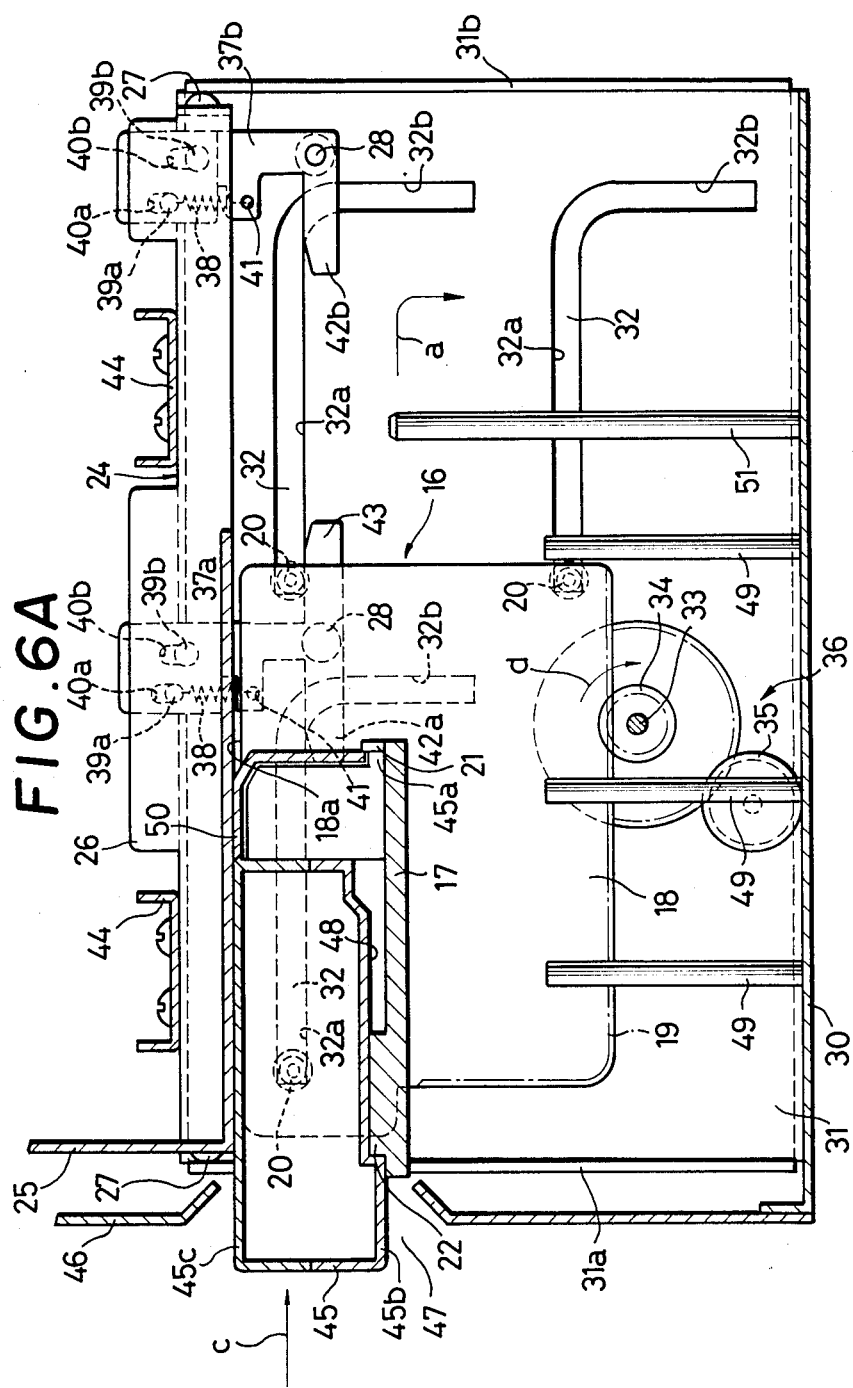

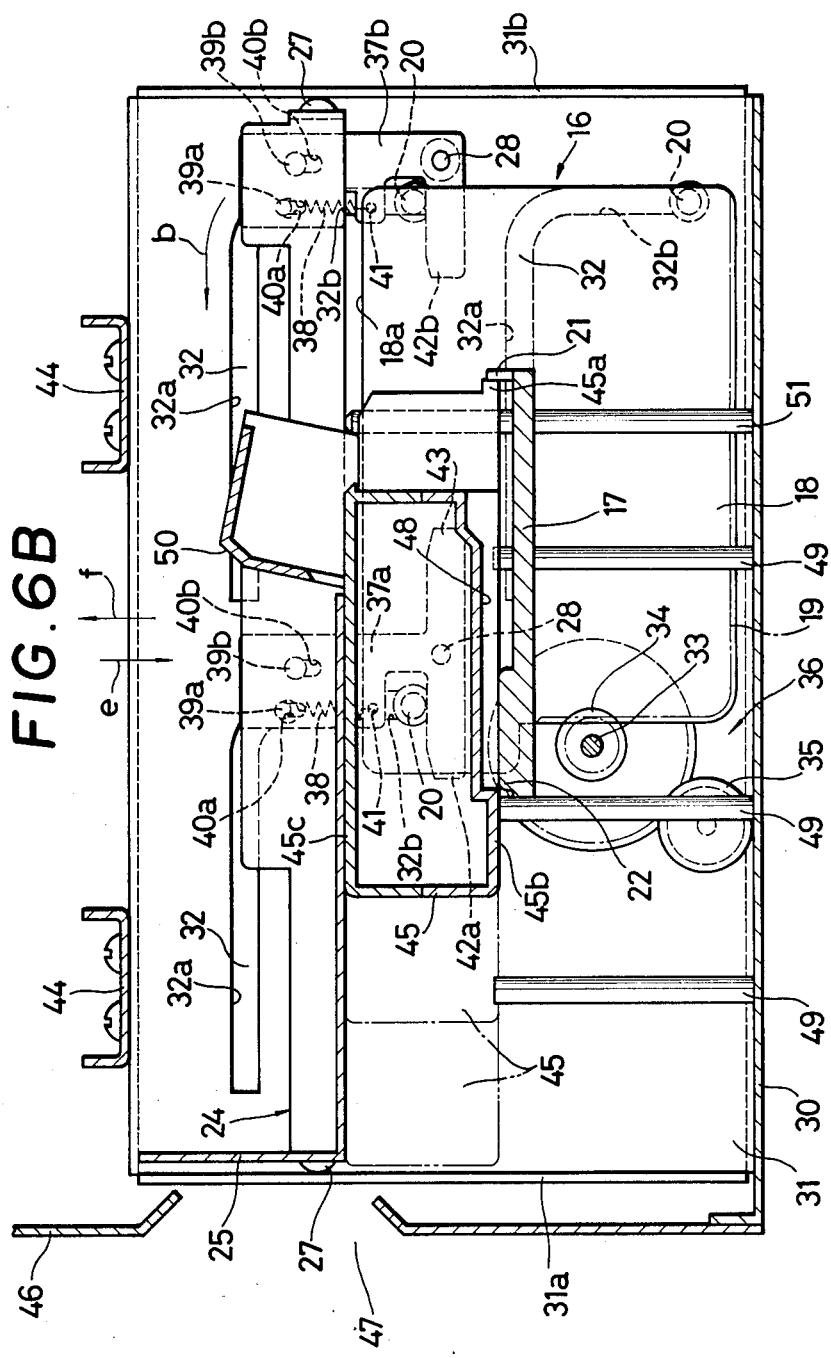

CASSETTE LOADING DEVICE

BACKGROUND OF THE INVENTION

1. Field of the Invention

This invention relates to a cassette loading device which has a cassette holder movable between a cassette inserting position and a cassette loading position, by which a cassette that is inserted in the cassette holder at the cassette inserting position is conveyed downward to the cassette loading position so as to be put on a positioning means disposed in the cassette loading position, and which is most suitably used for a cassette tape recording and/or reproducing apparatus, such for example, as a cassette video tape recorder.

2. Description of the Prior Art

In a conventional cassette loading device illustrated in FIGS. 1A to 2C, a cassette holder 1 comprises a bottom plate 1a, a pair of right and left side plates 1b and a top plate 1c arranged so as to form a rectangular section.

The cassette holder 1 is driven by a lifting mechnism (not shown) between a cassette inserting position shown in FIGS. 1A, 2A and a cassette loading position lying thereunder shown in FIGS. 1B, 2B in direction of arrows a and b, that is, along an inverted L-shaped route.

When loaded, a cassette 3 is inserted horizontally in direction of arrow C as shown in FIG. 1A through a cassette inserting aperture 5 opening in a front panel 4 into the cassette holder 1 which is to return to the cassette inserting position.

On this occasion, a front end face 3a of the cassette 3 abuts on a stopper 6 disposed at one end of the bottom plate 1a of the cassette holder 1 to put the cassette 3 in proper position and, as illustrated in FIG. 2B, a guide groove 7 formed along the center line of a bottom face 3b of the cassette 3 is engaged with a rail 8 formed along the center line of the bottom plate 1a of the cassette holder 1 so as to prevent the cassette 3 from being inserted inversely or upside-down and to provide proper positioning of the cassette 3 in a right to left orientation. In addition as illustrated in FIGS. 1A and 1B, a cassette pressing mechanism 11 which comprises a plurality of rollers 9, a leaf spring 10, etc. is disposed in the top plate 1c of the cassette holder 1 to resiliently urge the inserted cassette 3 down against the bottom plate 1a of the cassette holder 1.

After an insertion of the cassette, the cassette holder 1 is moved horizontally backward and then vertically downward in direction of arrow a shown in FIG. 1A to the cassette loading position by the lifting mechanism so as to engage a pair of right and left reels (not shown) within the cassette 3 with a pair of reel tables (not shown) on a chassis 12 in the cassette loading position as shown in FIGS. 1B, 2B.

On this occasion, the bottom face 3b of the loaded cassette 3 is put on a positioning means, which comprises a plurality of positioning pins 13 which are built in a chassis 12 and extend upwardly through the bottom plate 1a of the cassette holder 1 so as to from a gap A between the bottom face 3b of the cassette 3 and the bottom plate 1a of the cassette holder 1 and pressed down by the leaf spring 10 of the cassette pressing mechanism 11 for positioning the cassette 3.

By the way, the operation to take out the cassette 3 from the cassette holder 1 is accomplished by reversing the above operation, whereas the cassette holder is moved vertically upward and then horizontally forward in the direction of arrow b shown in FIG. 1A.

The conventional cassette loading device constituted as mentioned above has a defect as follows:

Lest a top face 3c of the cassette 3 should abut on the top plate 1c of the cassette holder 1 when the cassette 3 is set in the cassette loading position as illustrated in FIGS. 1B, 2B and separated by the predetermined gap A within the cassette holder 1 from the bottom plate 1a by the positioning pins 13, a predetermined gap B is necessary between the top face 3c and the top plate 1C, so that when the cassette 3 is inserted in the cassette holder 1 in the direction of arrow c as shown in FIGS. 1A, 2A, a conspicuously large gap C which is a sum of the gaps A and B is formed between the top face 3c of the cassette 3 and the top plate 1C of the cassette holder 1.

On the other hand, the larger a depth D of the guide groove 7 in the bottom face 3b of the cassette 3 becomes, the larger a thickness of the cassette 3 becomes. Hence, the rail 8 of the cassette holder 1 can not be so tall but must be generally less than gap C.

Such being the case, the bottom face 3b of the cassette 3 often runs on to the rail 8 of the cassette holder 1 as shown in FIGS. 1C, 2C because of the improper insertion of the cassette 3 into the cassette holder 1, so that it becomes impossible to prevent the cassette 3 from erroneous insertion and incorrect positioning in its right to left orientation.

As illustrated in FIGS. 1B, 2B to press stably the cassette 3 on the positioning pins 13 in the cassette loading position for positioning the cassette 3, it is important to have the cassette 3 pressed in a middle portion in a front to rear orientation of the cassette 3 and that in properly spaced, well-proportioned position in a right to left orientation of the cassette 3 by the cassette pressing mechanism 11.

Therefore, to press always stably each of the cassettes 3 on the pressing pins 13 even if the inserted cassettes 3 are different in sizes from one another, such for example, as shown by a solid line, dot-and-dash line and double-dots-and-dash line in FIGS. 2A, 2B, it is necessary to include a plurality of cassette pressing mechanisms suitable for the cassettes 3 of various sizes, respectively. Such causes to make a construction of the upper portion of the cassette holder 1 very complicate, the cassette dear and the inside of the cassette more crowded.

OBJECTS AND SUMMARY OF THE INVENTION

It is an object of the present invention to provide a cassette loading device capable of inserting securely a cassette in a cassette holder always without failure.

More specifically, it is an object of this invention to provide a cassette loading device capable of pressing always stably each of the cassettes of various sizes on a positioning means for positioning the cassette, even if the cassetes of various sizes are selectively inserted in a cassette holder.

A further object of the invention is to provide a cassette loading device wherein a cassette pressing mechanims, by which a cassette is pressed on a positioning means, is made simple in construction.

Still another object of the invention is to provide a cassette loading device capable of use in a low-profile apparatus by means of making an upper portion of a cassette holder simple in construction.

Still another object of the invention is to provide a cassette loading device capable of driving easily a cassette holder with a small-sized motor by means of reducing a load to move the cassette holder between a cassette inserting position to a cassette loading position.

The above, and other objects, features and advantages of this invention, will be apparent in the following detailed description of an illustrative embodiment thereof which is to be read in connection with the accompanying drawings wherein like reference numerals identify the corresponding parts in the several views.

BRIEF DESCRIPTION OF THE DRAWINGS

FIGS. 1A to 1C are a side view, partly broken away and in section, of a conventional cassette loading device of a cassette video tape recorder;

FIG. 2A is a sectional view taken along the line IIA—IIA on FIG. 1A;

FIG. 2B is a sectional view taken along the line IIB—IIB on FIG. 1B; and

FIG. 2C is a sectional view taken along the line IIC—IIC on FIG. 1C.

FIGS. 3 to 7 show a cassette loading device of a casette video tape recorder according to an embodiment of this invention.

FIG. 3 is an exploded, perspective view;

FIGS. 4A to 4C are side views, partly broken away and in section;

FIG. 5A is a sectional view taken along the line VA—VA on FIG. 4A;

FIG. 5B is a sectional view taken along the line VB—VB on FIG. 4C;

FIG. 6A is a sectional view taken along the line VIA—VIA on FIG. 5A;

FIG. 6B is a sectional view taken along the line VIB—VIB on FIG. 5B; and

FIG. 7 is a perspective view of a portion of a cassette pressing plate where a tension spring is attached.

DETAILED DESCRIPTION OF A PREFERRED EMBODIMENT

A cassette holding device as an embodiment of the invention in a cassette tape video recorder will now be described referring to FIGS. 3 through 7.

Figure 3:
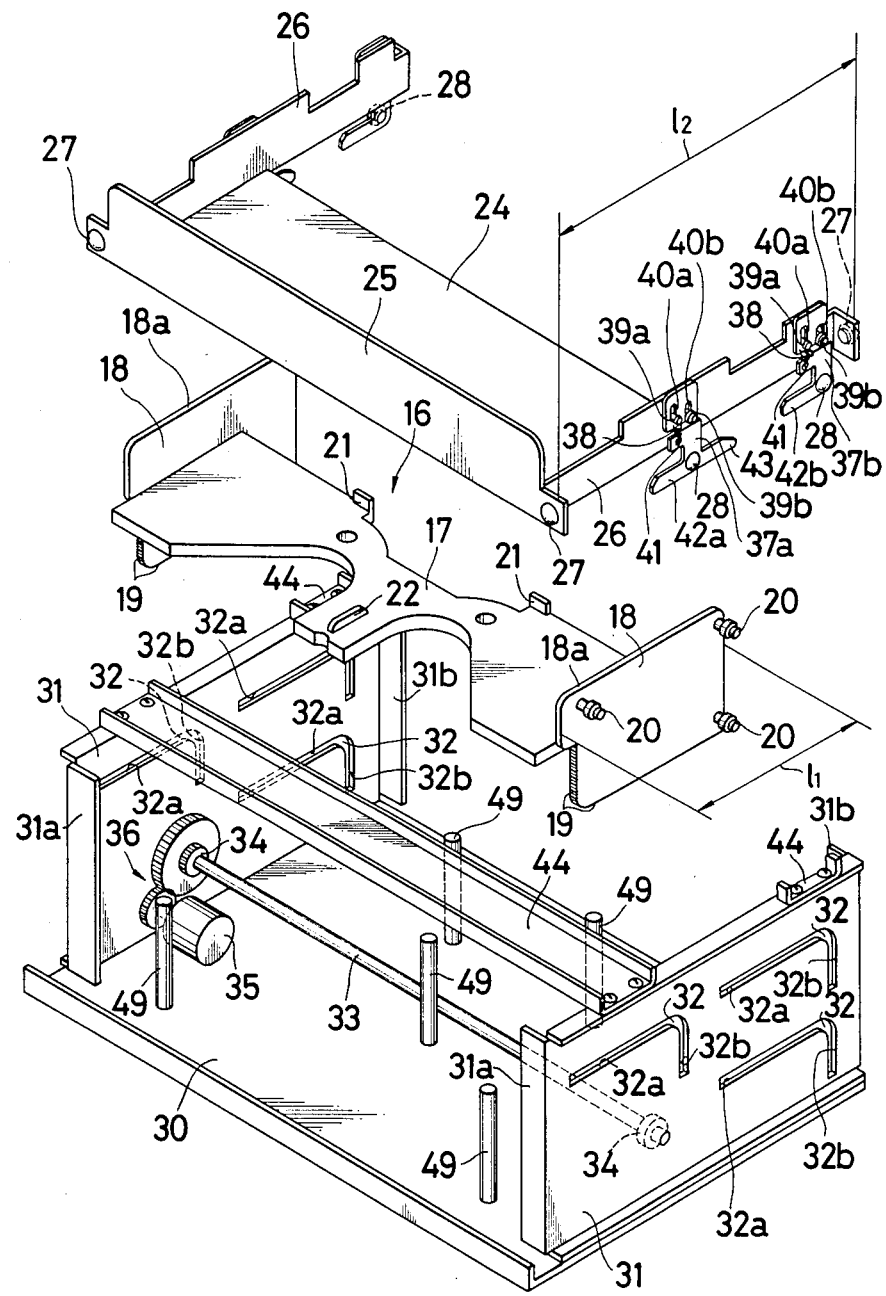

As shown in FIG. 3, a cassette holder 16 is composed of a horizontal bottom face plate 17 and a pair of side face plates 18 fixed vertically on both right and left sides of the bottom face plate 17. The cassette holder 16 is formed in nearly channel-like cross-section with its top opened. To have the side face plates 18 serve also as rack plates, each of side face plates 18 extends toward the lower side of the bottom face plate 17, and a L-shaped rack 19 is formed from a vertical front end face to a horizontal bottom end face.

On the outside of the side face plate 18 are rotatably installed three guide rollers 20 at a upper front end portion and at upper and lower rear end portions. At rear end portions of the bottom face plate 17 are provided stoppers 21 for defining the inserting position of the cassette, and along the center of the upper surface of the bottom face plate 17 is provided a rail 22 for preventing the erroneous insertion of the cassette and for positioning the cassette in its right to left orientation.

To cover the top of the cassette holder 16, a cassette pressing plate 24 is used as shown in FIG. 3. This cassette pressing plate 24 comprises a large horizontal plate with a length $l_2$ nearly twice as long as a length $l_1$ in the front to rear direction of the cassette holder 16 and has a front face plate 25 at its front end and a pair of side face plates 26 at its both ends, these face plates 25, 26 being formed through bending upwards and vertically each end portion of the cassette pressing plate 24.

Four sliding guides 27 faced forward and backward are fixed on both ends of the front face plate 25 and each rear end of the side face plates 26, and other four sliding guides 28 faced rightward and leftward are fixed on hereinafter described locking plates 37a, 37b which are arranged on two spaced-apart portions of the side face plates 26. These sliding guides 27, 28 are made of low-friction materials such as a nylon rivet.

As shown in FIG. 3, a pair of right and left lift guide plates 31 are fixed vertically to a chassis 30. Each of lift guide plates 31 is provided with three guide slots 32. This guide 32 is shaped into an inverted L-shaped form correspondingly to the L-shaped rack 19 and comprises a horizontal portion 32a and a vertical portion 32b in succession to the rear end thereof.

Front and rear edge portions 31a, 31b of both lift guide plates 31 are bent in the inside directions, at right angles. A rotary shaft 33 is supported horizontally and rotatably between both of these lift guide plates 31. A pair of driving pinions 34 are fixed near the ends of the rotary shaft 33, respectively and the rotary shaft 33 is driven in a forward or reverse direction by a motor 34 installed on the chassis 30 and through a reduction gear mechanism 36.

As shown in FIGS. 4A through 6B, the cassette holder 16 is put horizontally between both lift guide plates 31, and each of the three guide rollers 20 is engaged with each of the three guide slots 32. Each of both lacks 19 is engaged with each of both driving pinions 34. The large cassette pressing plate 24 is put on a pair of horizontal top end faces 18a of the side face plates 18 so as to cover the cassette holder 16 and put horizontally also between both lift guide plates 31.

The four sliding guides 27 on the front and rear ends of the cassette pressing plate 24 abut on insides of the front and rear edge portions 31a, 31b of both lift guide plates 31, and the four sliding guides 28 on the right and left sides of the cassette pressing plate 24 abut on insides of both lift guide plates 31 where the guide slots 32 are not to be disposed. Consequently, the cassette pressing plate 24 is guided by the eight sliding guides 27, 28 in total, so that it can perform a parallel movement in a vertical direction between both lift guide plates 31.

On each of the side face plates 26 are attached two locking plates 37a, 37b (four plates in total) through tension springs 38; one is near the center of the plate 26, the other is near the rear end of the plate 26. As shown in FIGS. 4A through 4C and FIG. 7, each of the locking plates 37a, 37b has a pair of elongated holes 40a, 40b which are mounted in a pair of guide pins 39a, 39b that are fixed to the side face plate 26 of the cassette pressing plate 24, so that the locking plates are slidably movable up-and-down within a predetermined extent.

The tension spring 38 is mounted between one of the guide pins 39a and a pin 41 secured to the locking plate 37a, 37b just under the guide pin 39a. Consequently, the locking plate 37a, 37b is normally biased upwards by a force of the tension spring 38.

On the lower end of the locking plate 37a, 37b is provided integrally a locking arm 42a and 42b extending forwards from the locking plate 37a, 37b. Among the four locking plates 37a, 37b, two locking plates 37a disposed at the front sides have locking arms 43 extending rearwards from their lower ends, too. The upper sides of the locking arms 42a, 42b, 43 are almost aligned with the lower edges of the horizontal portions 32a of the two guide slots 32 which are arranged on the upper portion of the lift guide plate 31.

Functions of the cassette loading device as above-mentioned will now be described.

The cassette holder 16 is moved along an inverted L-shaped route between the cassette inserting position shown in FIGS. 4A, 5A and 6A and the cassette loading position shown in FIGS. 4C, 5B and 6B, guided by the inverted L-shaped guide slots 32. The cassette pressing plate 24 is moved up and down, following the cassette holder 16. However when the cassette holder 16 is lifted to the cassette inserting position, the cassette pressing plate 24 lifted by the cassette holder 16 abuts on the lower surface of a pair of front and rear connecting members 44 which are fixed horizontally between top ends of both lift guide plates 31. Thereby, the cassette pressing plate 24 can not move further upwards.

As shown in FIGS. 4A, 6A, when loaded, the cassette 45 firstly is inserted horizontally in direction of arrow c into the cassette holder 16, which is lifted to the cassette inserting position, through a cassette inserting aperature 47 provided in a front face plate 46. On this occasion, a front end face 45a of the inserted cassette 45 abuts on the stoppers 21 installed in the cassette holder 16 for an inserting position of the cassette 45 to be rightly defined. As shown in FIGS. 5A and 6A, a guide groove 48 provided along the center of a bottom face 45b of the cassette 45 is engaged with the rail 22 on the cassette holder 16, thereby erroneous insertions of the cassette 45 are prevented and a proper positioning of the cassette 45 in the right to left orientation within the cassette holder 16 is performed.

As shown in FIG. 5A, gap E between the bottom face plate 17 of the cassette holder 16 and the cassette pressing plate 24 are designed nearly equal to height F of the cassette 45, the cassette 45 is put between the bottom face plate 17 and the cassette pressing plate 24 with a small gap in the vertical direciton.

When the above insertion of the cassette 45 is finished, it is detected by a sensor (not shown), the motor 35 is driven in the forward direction and both driving pinions 34 are driven by the rotary shaft 33 in direction of arrow d as shown in FIGS. 4A, 6A. Both racks 19 are then driven by both driving pinions 34 to move the guide roller 20 horizontally along the horizontal portion 32a and then vertically along the vertical portion 32b of the guide groove 32. Hence, the cassette holder 16 is moved in direction of arrow a, that is, horizontally backward and then vertically downward along the inverted L-shaped route, and brought into the cassette loading position as shown in FIGS. 4C, 5B and 6B. A pair of right and left reels (not shown) within the cassette 45 are engaged with a pair of right and left reel tables (not shown) disposed on the chassis 30 in the cassette loading position.

Accompanied by the cassette being loaded in to the cassette loading position, the bottom face 45b of the cassette 45 is put on and engaged with a plurality of positioning pins 49, which are planted on the chassis 30 and extend through the bottom face plate 17 of the cassette holder 16, so as to position the cassette 45. On this occasion, a front lid 50 of the cassette 45 abuts on a lid opening rod 51 planted on the chassis, and thereby it is rotated counterclockwise as shown in FIG. 6B to be opened.

On the other hand, following the cassette holder 16 from the cassette inserting position to the cassette loading position, the cassette pressing plate 24 is pulled through the four tension springs 38 and moved vertically downward in the direction of arrow e as shown in FIGS. 4C, 5B and 6B.

Figure 7:
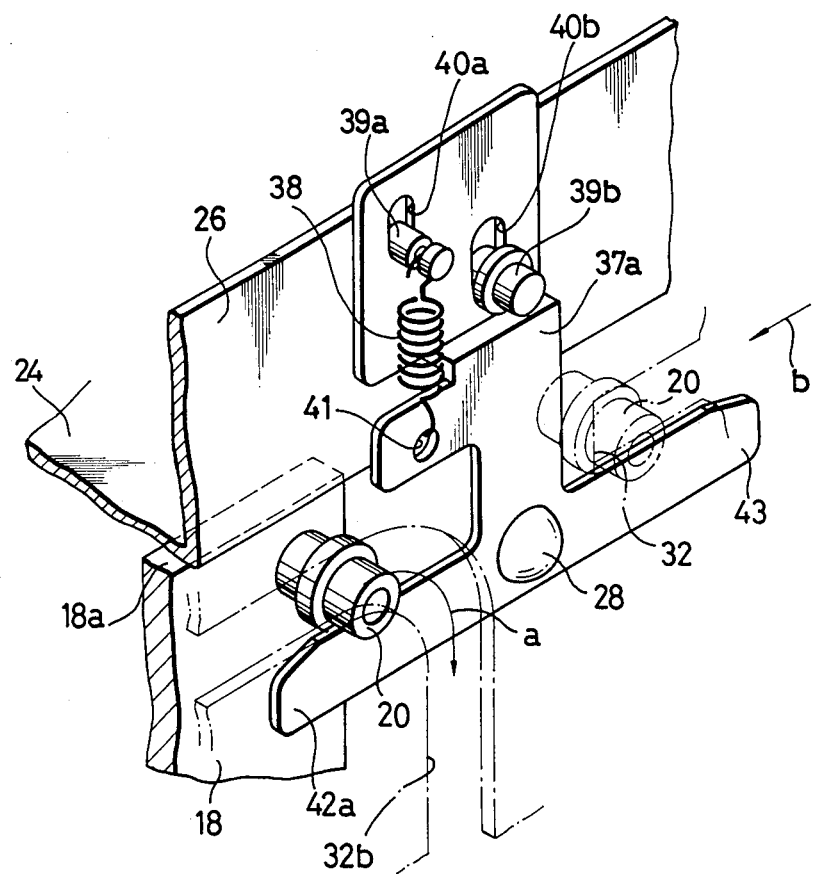

That is, when the cassette holder 16 is moved horizontally backward along the horizontal portion 32a of the guide groove 32 from the position shown in FIG. 4A to the position shown in FIG. 4B, the cassette holder 16 slides along the lower surface of the cassette pressing plate 24, and when the cassette holder 16 reaches the position shown in FIG. 4B, a pair of guide rollers 20 disposed at the upper side of the cassette holder 16 shown by a solid line in FIG. 7, are engaged with the locking arms 42a, 42b extending forward from the locking plates 37a, 37b, respectively.

Subsequently when the cassette holder 16 is moved vertically downward along the vertical portion 32b of the guide groove 32, the above pair of guide rollers 20 pull the locking plates 37a, 37b down through the locking arms 42a, 42b in the direction of arrow e. As a result, when the cassette holder 16 is moved vertically downwrad, the cassette pressing plate 24 is moved vertically downward, in the direction of arrow e together with the cassette holder 16 through the four locking plates 37a, 37b and four tension springs which are pulled alike by the locking plates 37a, 37b.

As shown in FIG. 5B, when the cassette holder 16 reaches the cassette loading position and the cassette 45 abuts on the plurality of positioning pins 49, the cassette 45 separates from the bottom face plate 17 of the cassette holder 16 by a predetermined gap A, and thus the successively descending cassette pressing plate 24 elastically pushes a top face 45c of the cassette 45 in the direction of arrow e by the force of the tension springs 38. Thereby the cassette 45 is properly positioned on the positioning pins 49.

On this occasion, as the cassette pressing plate 24 is large enough to press the whole top face 45c of the cassette 45 in a state of equilibrium, the cassette 45 is quite stably pushed on the plurality of positioning pins 49 for positioning the cassette 45.

When the above-mentioned cassette loading 45 is over and that detected by a sensor (not shown), the motor 35 is stopped and reverse rotation of the motor 35 is prevented by a worm gear (not shown) included in the reduction gear mechanism 36, and the cassette holder 16 is set in the cassette loading position.

In addition, an operation of taking out the cassette 45 from the apparatus is in the reverse order of the above-mentioned cassette loading operation. That is, the motor 35 in reverse rotation moves the cassette holder 16 vertically upward and then horizontally forward in direction of arrow b shown in FIG. 6B. When the cassette holder 16 returns to the cassette inserting position shown in FIG. 6A, the two rear guide rollers 29 are engaged as shown by a imaginary line in FIG. 7 with the locking arms 43 extending rearward from the two locking plates 37a which disposed in front of the above rollers 20. Thereby, looseness of the cassette pressing plate 24 in its vertical direction on the cassette holder 16 is prevented.

According to the cassette loading device constituted and operated as mentioned above, the cassette 45 can be inserted as shown in FIGS. 5A, 6A in the cassette 16 with a small vertical gap between the bottom face plate 17 and the cassette pressing plate 24. Therefore, it never occurs to cause such an erroneous operation that the bottom face 45b of the cassette 45 rides on the rail 22 of the cassette holder 16, and thereby preventing incorrect insertion of the cassette and assuring the proper positioning in the right to left orientation of the cassette 45.

As shown in FIG. 5B, when the cassette 45 is loaded in the cassette loading position, the large cassette pressing plate 24 pushes the whole top face 45c of the cassette 45 in a good balance and in an equilibrium. Hence, the cassette 45 can be pushed so as to be set quite stably on the positioning pins 49. Consequently even if the cassettes 45 of various sizes are selectively inserted as shown by a solid line, dot-and-dash line and double-dots-and-dash line in FIG. 5B, the large cassette pressing plate 24 can always push the whole top face 45a of each inserted cassette 45 in good balance and in equilibrium. Thereby the cassette 45 can be always pushed quite stably and positioned properly on the positioning pins 49.

According to the cassette loading device as described above, when the cassette 45 is loaded in the cassette loading position as shown in FIG. 6B, the cassette inserting aperture 47 in the front face plate 46 is closed from the inside by the front face plate 25 of the cassette pressing plate 24. Accordingly, this cassette pressing plate 24 serves also as a lid of the cassette inserting aperture 47.

Although an embodiment of the invention has been described, the lifting drive mechanism of the cassette holder 16 or the cassette pressing plate 24 is not restricted to the construction shown in the embodiment but various effective modifications can be made on the basis of the technical idea of the invention.

In the embodiment, the guide roller 20, disposed on the cassette holder 16 serves as a locking member to be locked to the locking plates 37a, 37b. However, besides the guide roller 20 may be provided a locking member, such as a pin, roller or locking piece.

The present invention is not limited to the cassette loading device of the cassette video tape recorder but can be applied to cassette loading devices of various sorts of cassette tape recording and/or reproducing apparatus or information processing apparatus.

The cassette loading device of this invention has a cassette holder movable between a cassette inserting position to a cassette loading position lying thereunder, after an insertion of a cassette in the cassette holder which is lifted to the cassette inserting position, the cassette being removed from the cassette inserting position to the cassette loading position and put on a positioning means in the cassette loading position for positioning the cassette, and this cassette loading device comprises,
  (a) a channel-shaped cassette holder opened at the top;
  (b) a cassette pressing plate put on said top of the cassette holder so as to cover said cassette holder; and
  (c) a pressing means capable of pressing said cassette pressing plate on said top of the cassette holder,
  (d) said cassette pressing plate being moved downward, following said cassette holder which is moved downward from said cassette inserting position to said cassette loading position and pushing the top face of said cassette in the downward direction by said cassette pressing plate on which a thrust of said pressing means acts, so as to press and position said cassette on said positioning means.

According to the invention, when the cassette holder is moved downward to the cassette loading position and the cassette is put on the positioning means in the cassette loading position, the cassette separates from the cassette holder and is pressed by the cassette pressing plate through the force of the pressing means, so as to be positioned properly and stably on the positioning means. Therefore, any excessive gap is not required between the cassette and the cassette pressing plate when the cassette is inserted in the cassette holder, that is, the cassette can be inserted between the bottom face plate of the cassette holder and the cassette pressing plate even though the gap therebetween is scarcely given. As a result, the cassette can be always inserted very acccurately and securely, and it does not occur to make it impossible due to the bottom face of the cassette riding on the rail to prevent the cassette from an erroneous insertion and to position the cassette properly in the right to left orientation of the cassette holder when the cassette is inserted.

Further, as the cassette pressing plate can push the whole top face of the cassette in good balance and uniformly even if cassettes of various sizes are selectively used, any one of the cassettes of various sizes can be always quite stably pressed and set on the positioning means.

In addition, because in the cassette loading device of this invention is not required such a cassette pressing mechanism as in the conventional one, the construction becomes very simple and the device can be produced at lower cost. Moreover, a space factor on the upper side of the cassette holder can be improved significantly, so that the device can be made thinner.

Further, the cassette loading device of this invention has a lifting mechanism of a cassette holder which moves the cassette holder horizontally backward from a cassette inserting position and then vertically downward to a cassette loading position, in which a cassette is inserted horizontally in the cassette holder at the cassette inserting position and conveyed horizontally backward and then vertically downward to the cassette loading position so as to put the cassette on a positioning means for positioning the cassette in the cassette loading position, and this cassette loading device comprises,
  (a) a channel-shaped cassette holder opened at the top;
  (b) a cassette pressing plate put horizontally on said top of the cassette holder so as to cover said cassette holder;
  (c) guide member to guide said cassette pressing plate only in the vertical direciton as said cassette pressing plate follows said cassette holder moved between said cassette inserting position and said cassette loading position;
  (d) a locking means attached to said cassette pressing plate so as to be movable within a predetermined extent only in a direction perpendicular to said cassette pressing plate;
  (e) an urging means to urge said locking means in an upward direciton of said cassette pressing plate; and
  (f) a locking member disposed on said cassette holder and locked said locking means when said cassette holder is moved horizontally backward from said cassette inserting position,
  (g) said locking member being locked to said locking means when said cassette holder is moved horizontally backward from said cassette inserting position, said cassette pressing plate thereafter following said cassette holder through said urging means so as to be moved vertically downward when said cassette holder moves vertically downward to said cassette loading position, and said cassette pressing plate then pushing the top face of said cassette through a force of said urging means so as to press said cassette on said cassette positioning means for positioning said cassette when said cassette holder is removed to said cassette loading position.

According to this invention, when the cassette holder moves from the cassette inserting position to the cassette loading position, a heavy load therefore does not act on the cassette holder. That is, the cassette pressing plate is moved only in the vertical direciton, whereas the cassette holder travels on an inverted L-shaped route, the route horizontally backward and then vertically downward.

If a spring which serves to push the cassette pressing plate to the cassette holder is mounted directly between the cassette holder and the cassette pressing plate, it occurs that the spring is pulled by the cassette holder even when the cassette holder moves horizontally downward. Moreover, since the travelling stroke of the cassette holder in this horizontal direction is rather long, the spring is extended considerably and exposed to the large load when the cassette holder moves horizontally.

According to the present invention, however, when the cassette holder is horizontally drawn further to the rear position of the cassette inserting aperture, the cassette holder is locked to the locking plate on the cassette pressing plate, so that the spring is not loaded while the cassette holder is drawn horizontally, and only when the cassette moves vertically downward to the cassette loading position, the cassette is pushed at its upper side by the force of the spring through the cassette pressing plate. Consequently, the load on the spring can be reduced significantly on the occasion when the cassette holder is moved from the cassette inserting position to the cassette loading position. As a result, the load on the cassette holder lifting mechanism becomes small and it becomes possible to make the motor for driving the machanism small. Furthermore, because the cassette pressing plate is so constructed as to be movable only vertically, a spring of high spring constant can be used, so that the cassette can be quite stably and horizontally pushed and set on the positioning means in the cassette loading position.

What is claimed is:

1. A cassette loading device movable between a cassette inserting position and a cassette loading position lying thereunder after insertion of a cassette in the cassette inserting position, and upon movement to the cassette loading position a positioning element is arranged for positioning the cassette, the cassette loading device comprising:
a channel-shaped cassette holder opened at a top of the channel;
a cassette pressing plate arranged above said cassette holder so as to cover said cassette holder; and
engagement means including a first element affixed to said cassette holder and a second element affixed to said cassette pressing plate, said first and second elements being arranged for mutual engagement, whereby motion in a selected direction of said cassette holder causes motion of said cassette pressing plate;
a pressing means affixed to said second element of said engagement means for pressing said cassette pressing plate on an upper surface of said cassette holder upon engagement of said first and second elements,
whereby, upon said cassette holder being moved downward from said cassette inserting position to said cassette loading position, a top face of said cassette is pushed in the downward direction by said cassette pressing plate on which a thrust of said pressing means acts, so as to press and position said cassette on said positioning element.

2. A cassette loading device according to claim 1, wherein said pressing means comprises a spring.

3. A cassette loading device according to claim 1, wherein a cassette holder lifting mechanism is so disposed as to move said cassette holder horizontally backward from said cassette inserting position and then vertically downward to said cassette loading position.

4. A cassette loading device according to claim 1 or 2, wherein said first and second elements of said engagement means cooperate to move said cassette pressing plate only in the vertical direction when said cassette holder moves between said cassette inserting position and said cassette loading position.

5. A cassette loading device according to claim 1, wherein the width of said cassette holder in a right to left direction perpendicular to a cassette inserting direction is so given as to be able to insert selectively cassettes of various sizes.

6. A cassette loading device according to claim 5, wherein a rail is disposed on a bottom plate of said cassette holder for engagement with a guide groove disposed on each bottom face of said cassettes of various sizes, when said cassettes of various sizes are inserted selectively in said cassette holder, thereby to position said cassettes of various sizes in a right to left orientation within said cassette holder.

7. A cassette loading device having a lifting mechanism moving a cassette holder horizontally backward from a cassette inserting position and then vertically downward to a cassette loading position, in which a cassette is inserted horizontally in the cassette holder at the cassette inserting position and conveyed horizontally backward and then vertically downward to the cassette loading position so as to place the cassette on a positioning element for positioning the cassette in the cassette loading position, the cassette loading device comprising:
a channel-shaped cassette holder opened at a top of the channel;
a cassette pressing plate arranged horizontally above the cassette holder so as to cover said cassette holder;
guide means for guiding said cassette pressing plate only in a vertical direction as said cassette pressing plate follows said cassette holder upon movement thereof between said cassette inserting position and said cassette loading position; and
said guide means including a locking means slidably attached to said cassette pressing plate and arranged to be movable within a predetermined extent only in a direction perpendicular to said cassette pressing plate, an urging means to slidably urge said locking means in an upward direction on said cassette pressing plate, and a locking member disposed on said cassette holder for locking engagement with said locking means when said cassette holder is moved horizontally backward from said cassette inserting position, whereby said locking member is locked to said locking means when said cassette holder is moved horizontally backward from said cassette inserting position, said cassette pressing plate thereafter following said cassette holder so as to be moved vertically downward when said cassette holder moves vertically downward to said cassette loading position, and said cassette pressing plate pushes against an upper surface of said cassette through a force of said urging means so as to press said cassette on said cassette positioning element for positioning said cassette when said cassette holder is moved to said cassette loading position.

8. A cassette loading device according to claim 7, wherein said urging means comprises a spring.

9. A cassette loading device according to claim 7 or 8, wherein said locking means, said urging means and said locking members are disposed in plural numbers on respective vertical sides of said cassette holder.

10. A cassette loading device according to claim 7 or 8, wherein the width of said cassette holder in a right to left direction perpendicular to the cassette inserting direction is provided so as to be able to insert selectively cassettes of various sizes.

11. A cassette loading device according to claim 10, wherein a rail is disposed on a bottom plate of said cassette holder and arranged for engagement with a guide groove disposed on each bottom face of said cassettes of various sizes, when said cassettes of various sizes are inserted selectively in said cassette holder, thereby to position said cassettes of various sizes in a right to left orientation within said cassette holder.

* * * * *